United States Patent
Ma et al.

(10) Patent No.: US 7,129,284 B2
(45) Date of Patent: Oct. 31, 2006

(54) FLUOROSURFACTANT PACKAGES FOR USE IN INKJET PRINTING AND METHODS OF CONTROLLING PUDDLING IN INKJET PENS

(75) Inventors: Zeying Ma, San Diego, CA (US); Richard Anderson, Escondido, CA (US)

(73) Assignee: Hewlett-Packard Development Company, L.P., Houston, TX (US)

(*) Notice: Subject to any disclaimer, the term of this patent is extended or adjusted under 35 U.S.C. 154(b) by 299 days.

(21) Appl. No.: 10/309,520

(22) Filed: Dec. 3, 2002

(65) Prior Publication Data

US 2004/0106696 A1 Jun. 3, 2004

(51) Int. Cl.
*C09D 11/10* (2006.01)
*C08L 39/04* (2006.01)
*B41J 2/01* (2006.01)

(52) U.S. Cl. .................. 523/160; 524/555; 347/98; 347/100

(58) Field of Classification Search ............... 523/160, 523/161; 524/546, 555; 106/31.59; 347/98, 347/100, 105, 106
See application file for complete search history.

(56) References Cited

U.S. PATENT DOCUMENTS

| | | | |
|---|---|---|---|
| 4,317,753 A | 3/1982 | Tsuchiya et al. | |
| 4,552,923 A | 11/1985 | Tsuchiya et al. | |
| 5,218,031 A * | 6/1993 | Nayder et al. | 524/376 |
| 5,302,437 A * | 4/1994 | Idei et al. | 428/32.22 |
| 5,445,671 A | 8/1995 | Herget et al. | |
| 6,001,482 A | 12/1999 | Anderson et al. | |
| 6,004,389 A | 12/1999 | Yatake | |
| 6,180,238 B1 | 1/2001 | Malhotra | |
| 6,200,372 B1 | 3/2001 | Krishnan et al. | |
| 6,261,350 B1 | 7/2001 | Kabalnov | |
| 6,284,426 B1 | 9/2001 | Coppens et al. | |
| 6,312,082 B1 | 11/2001 | Lund et al. | |
| 6,315,392 B1 | 11/2001 | Kinas et al. | |
| 6,318,260 B1 | 11/2001 | Chu et al. | |
| 6,318,264 B1 | 11/2001 | D'Heureuse et al. | |
| 6,326,075 B1 | 12/2001 | Nagasaki et al. | |
| 6,342,094 B1 * | 1/2002 | Kabalnov | 106/31.25 |
| 6,406,138 B1 * | 6/2002 | Gore | 347/96 |
| 6,485,139 B1 | 11/2002 | Lavery et al. | |
| 6,630,017 B1 * | 10/2003 | Ma et al. | 106/31.59 |
| 2004/0024083 A1 * | 2/2004 | Lee | 523/160 |
| 2004/0063808 A1 * | 4/2004 | Ma et al. | 523/160 |

FOREIGN PATENT DOCUMENTS

| | | |
|---|---|---|
| EP | 0291214 | 8/1992 |
| EP | 1258510 | 11/2002 |
| JP | 63-299971 | 12/1988 |
| WO | WO 00/37258 | 6/2000 |
| WO | WO 01/60961 | 8/2001 |
| WO | WO 02/26901 | 4/2002 |
| WO | WO 02/45970 | 6/2002 |
| WO | WO 02/45971 | 6/2002 |

* cited by examiner

*Primary Examiner*—Callie Shosho (57) ABSTRACT

An inkjet printing system for use in offset printing comprises a fixer fluid and an ink. The fixer fluid comprises a fixer polymer and a first fluorosurfactant package having a fluorosurfactant and a hydrocarbon surfactant. The ink comprises a charged dye and a second fluorosurfactant package. Methods for improving print quality in offset printing using the inkjet printing system and the fixer fluid are also disclosed.

26 Claims, 5 Drawing Sheets
(5 of 5 Drawing Sheet(s) Filed in Color)

FLUOROSURFACTANT PACKAGES FOR USE IN INKJET PRINTING AND METHODS OF CONTROLLING PUDDLING IN INKJET PENS

FIELD OF THE INVENTION

The present invention relates to an inkjet printing system and, more specifically, to a fixer fluid and an ink for use in offset printing.

BACKGROUND OF THE INVENTION

The use of inkjet printers in offices and homes has grown dramatically in recent years. The growth can be attributed to drastic reductions in cost of the inkjet printers and substantial improvements in print resolution and overall print quality of the printed images. With the success in home and office applications, inkjet printing is presently being adapted for commercial printing applications, such as for printing brochures, magazines, or catalogs. Currently, commercial printing is performed by a variety of techniques, such as rotogravure printing, screen printing, letterpress, or flexography. However, these printing techniques are time consuming and inefficient because they require individual templates, such as plates, to be produced. Therefore, it is generally only economical to commercially print an item when large volumes are needed, such as when more than 1000 items are needed. Commercial printing uses different print media than inkjet printing, which is typically done on plain paper. In contrast, commercial printing uses glossy, smooth print media.

Commercial print media are smooth and glossy due to a nonporous coating on the surface of the media. The nonporous coating is a hydrophobic material, such as a hydrophobic polymer. Since this coating is hydrophobic, inks used in commercial printing are typically oil-based. In contrast, the majority of inks used in inkjet printing are aqueous-based. These inkjet inks are generally not compatible with the existing commercial print media because the aqueous-based inkjet inks do not penetrate into the nonporous coating. Therefore, in order to print commercial volumes using inkjet printing, modified inkjet inks for use on commercial print media have been developed. However, images printed with these inkjet inks have reduced resolution, durability, and print quality.

An aqueous inkjet ink that has been disclosed includes an ink colorant and at least one nonionic surfactant having a hydrophobic/lipophilic balance ("HLB") value between 4 and 14. Nonionic surfactants used in the inks include TRITON®, SILWET®, SURFYNOL®, TERGITOL®, BRIJ®, FLUORAD®, and ZONYL® compounds.

Specialty print media have also been developed to solve the compatibility problems between hydrophobic media and aqueous based inks. However, these specialty print media are generally more expensive than plain paper or existing commercial print media.

Due to the cost and efficiency limitations of other printing techniques, commercial printing using inkjet printers is a rapidly developing area. The term "offset printing" or "offset market" is used herein to refer to commercial printing using inkjet printing, such as digital printing. Offset printing is used by businesses to print commercial volumes of printed materials, such as brochures, magazines, or catalogs. The print media used in offset printing, referred to herein as offset media, are nonporous in comparison to plain paper. The offset medium has a coating on its top surface, which provides smoothness, increased opacity, and ink penetration resistance.

The large volumes of items that are printed in offset printing require high speed of the printing process. Reliable printer pens that do not need frequent servicing are also necessary because they contribute to the overall speed of the printing process. To improve the reliability of the printer pens and improve the speed of the printing process, inkjet inks used in offset printing must not puddle on a surface of a printhead, such as the orifice plate. Puddling is related to the ink's viscosity, with low-viscosity inks tending to puddle on the orifice plate and cause drop misdirectionality, ink accumulations on the orifice plate, and service difficulties. To reduce puddling, solutions that increase the viscosity of the ink have been proposed. For example, adding high molecular weight surfactants, polymers, or oligomers to the ink has been suggested. However, these additives typically have a deleterious effect on print quality and durability, such as waterfastness and smear.

To improve print quality and durability, some printing techniques have used a two-part printing system that utilizes a fixer fluid and an ink. In combination, the fixer fluid and ink improve the durability and image quality of the printed image. The fixer fluid and ink are deposited on the print medium by either under- or over-printing. In under-printing, the fixer fluid is deposited on the print medium before the desired image is printed with the ink. In over-printing, the fixer fluid is deposited over the ink. When the fixer fluid and ink are both present on the print medium, a charged dye in the ink combines with an oppositely charged fixer polymer in the fixer fluid, thereby fixing the dye to the print medium. For example, an anionic dye in the ink binds with a cationic fixer polymer in the fixer fluid. The cationic fixer polymer acts as a bulky, multivalent counterion to the anionic dye, thereby reducing the solubility and mobility of the dye. Inversely, a cationic dye in the ink binds with an anionic fixer polymer in the fixer fluid.

The use of a fixer fluid and an ink in inkjet printing is a relatively new concept. An inkjet ink printing system that utilizes an ink and a fixer fluid has been disclosed. The ink includes a water-soluble dye, a vesicle-forming surfactant, a polymeric binder, and, optionally, a spreading agent that is compatible with the dye-vesicle-binder system. The spreading agent is a fluorocarbon or silicon spreading agent or a hydrocarbon surfactant. The fixer fluid includes a polymer having a charge opposite to the charge of the vesicles in the ink and, optionally, spreading agents. The spreading agents are nonionic surfactants and include a mixture of a hydrocarbon surfactant and a fluorinated surfactant. By using this inkjet ink printing system, improved chroma, color-to-color bleed, and edge acuity properties are achieved.

Another process discloses an inkjet printing process to improve waterfastness. The process comprises applying a fixing composition and an ink to a substrate, such as a coated, offset type paper. The fixing composition includes polymonoguanides ("PMGs") or polyhexamethylene biguanide ("PHMB"). Waterfastness was improved in those printing processes that utilized PMGs in the fixing composition relative to the fixing compositions that included PHMB. PMGs have also been used in coating compositions for recording material, as disclosed in International Patent Application WO/0245970.

Another inkjet printing method using PHMB was disclosed. In the method, a substrate was treated with a PHMB-containing solution before, during, or after inkjet printing to improve the waterfastness of printed images. The PHMB-containing solution was applied to the substrate by dip coating, reverse roller coating, K-bar coating, spraying, or using an inkjet printer. The PHMB-containing solution included optional ingredients, such as crosslinkers, surfactants, or drying-time accelerants.

PHMB has also been used to fix concealed information to a substrate. The concealed information is subsequently detectable by treating or washing the substrate.

To improve the quality of images printed on offset media, it would be desirable to produce an inkjet printing system for use in offset printing. Specifically, it would be desirable to produce a fixer fluid and an ink having improved puddling, bloom, and bleed properties, in addition to providing improved durability and print quality.

BRIEF SUMMARY OF THE INVENTION

The present invention relates to an inkjet printing system for use in offset printing. The inkjet printing system comprises a fixer fluid and an inkjet ink. The fixer fluid comprises a fixer polymer and a first fluorosurfactant package. Preferably, the first fluorosurfactant package comprises a fluorosurfactant and a hydrocarbon surfactant. The ink comprises a charged dye and a second fluorosurfactant package. Preferably, the second fluorosurfactant package comprises a fluorosurfactant and one or two hydrocarbon surfactants.

A method for improving print quality in offset printing is also disclosed. The method comprises providing the fixer fluid, which comprises the fixer polymer and the first fluorosurfactant package, and providing the ink, which comprises the charged dye and the second fluorosurfactant package. The first fluorosurfactant package comprises a fluorosurfactant and a hydrocarbon surfactant while the second fluorosurfactant package comprises a fluorosurfactant and two hydrocarbon surfactants. The ink and fixer fluid are deposited on an offset medium.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

While the specification concludes with claims particularly pointing out and distinctly claiming that which is regarded as the present invention, the present invention can be more readily ascertained from the following description of the several embodiments of the invention when read in conjunction with the accompanying drawings in which:

DETAILED DESCRIPTION OF THE INVENTION

An inkjet printing system including a fixer fluid and an ink for use in offset printing is disclosed. The fixer fluid is used with the ink to achieve improved durability and print quality on an offset medium. The fixer fluid has a fixer polymer and at least one surfactant, which is referred to herein as a first fluorosurfactant package. Preferably, the first fluorosurfactant package has at least two surfactants, a fluorosurfactant and a hydrocarbon surfactant. The ink includes a charged dye and at least one surfactant, which is referred to herein as a second fluorosurfactant package. Preferably, the second fluorosurfactant package has a fluorosurfactant and at least two hydrocarbon surfactants. Preferably, the first and second fluorosurfactant packages have different fluorosurfactants and hydrocarbon surfactants. The ink exhibits improved puddling, bloom, and bleed properties in comparison to an ink lacking the second fluorosurfactant package. In addition, improved edge acuity and high resolution are achieved when the fixer fluid and ink are printed on an offset medium.

These improvements in puddling, bloom, bleed, edge acuity, and resolution are also achieved in the inkjet printing system when only one of the fixer fluid or ink has the first surfactant package or the second surfactant package, respectively. In other words, these improvements are achieved where either the fixer fluid has the first surfactant package or the ink has the second surfactant package.

The amounts of the components in the fixer fluid and ink are expressed in weight percent ("wt %") or in grams of the total weight of the ink composition. The purity of all components is that used in normal commercial practice for inkjet inks.

The inkjet printing system including the fixer fluid and ink described herein may be used to improve the print quality and durability of an image printed by offset printing. The inkjet printing system may be used to print on offset media. Since the fixer fluid controls bloom and bleed on offset media, ink formulations may be released from the constraints of solving these problems.

Fixer Fluid

The fixer fluid may be an aqueous-based, clear fluid that includes a fixer polymer and a first fluorosurfactant package. The first fluorosurfactant package has at least one surfactant. The fixer fluid may optionally have components known in the art, such as co-solvents, humectants, pH adjusting agents, antioxidants, and antibacterial agents, depending on the desired properties of the fixer fluid. The co-solvents may include, but are not limited to, aliphatic alcohols, aromatic alcohols, diols, glycol ethers, poly(glycol) ethers, cyclic amides, caprolactams, formamides, acetamides, and long chain alcohols. Examples of co-solvents employed in the practice of this invention include, but are not limited to, primary alcohols of 30 carbons or less, primary aromatic alcohols of 30 carbons or less, secondary aliphatic alcohols of 30 carbons or less, secondary aliphatic alcohols of 30 carbons or less, 1,3-alkyldiols of 30 carbons or less, alkyltriols of 30 carbons or less, 1,U-alcohols of 30 carbons or less, ethylene glycol alkyl ethers, propylene glycol alkyl ethers, poly(ethylene glycol) alkyl ethers, higher homologs of poly(ethylene glycol) alkyl ethers, poly(propylene glycol) alkyl ethers, higher homologs of poly(propylene glycol) alkyl ethers, N-alkyl caprolactams, unsubstituted caprolactams, substituted formamides, unsubstituted formamides, substituted acetamides, and unsubstituted acetamides. For instance, the co-solvents used in the present invention may be 2-pyrrolidinone, 1,2-hexanediol, N-methyl pyrrolidone, 1,5-pentanediol, diethylene glycol, 1,3-(2-methyl)-propanediol, 1,3,5-(2-methyl)-pentanetriol, tetramethylene sulfone, 3-methoxy-3-methylbutanol, glycerol, 3-pyridylcarbinol, pentaerythritol, or 1,2-alkyldiols, or mixtures thereof.

The fixer polymer may be a charged polymer that binds with an oppositely charged dye in the ink. Preferably, the fixer polymer is cationic while the dye is anionic. The fixer polymer may be a cationic polymer, such as a polyamine. The cationic fixer polymer may include, but is not limited to, polyethylene imine ("PEI"), polyallylamine, polyvinyl pyrrolidone, a polymer of hexamethylene guanide ("HMG"), a polymer of hexamethylene biguanide ("HMB"), or poly (hexamethylene biguanide) ("PHMB"). Preferably, the fixer polymer is PEI, PHMB, or a copolymer of HMB and HMG. PHMB is available from Avecia Ltd. (Manchester, England). The fixer polymer may be present at a range of approximately 0.2–10 wt %. Preferably, the fixer polymer is present at approximately 0.5–7 wt %. Most preferably, the fixer polymer is present at approximately 1–4 wt %.

The fixer fluid may also include an organic or inorganic acid, which may convert the fixer polymer into a quaternized form. Preferably, the organic acids are citric acid, succinic acid, phosphoric acid, or acetic acid and the inorganic acid is hydrochloric acid. The organic acid may be present at approximately 0.05–8 wt % of the total weight of the ink composition. The organic or inorganic acid may be a counterion to the fixer polymer. Preferably, the counterion is acetate, citrate, succinate, phosphate, chloride, or nitrate. The fixer fluid may also include both an organic and an inorganic acid.

The first fluorosurfactant package may have at least one surfactant such as a fluorosurfactant, a hydrocarbon surfactant, a mixture of fluorosurfactants, a mixture of hydrocarbon surfactants, or a mixture of at least one fluorosurfactant and at least one hydrocarbon surfactant. If more than one surfactant is present, the total amount of the first fluorosurfactant package present in the fixer fluid is the amount of fluorosurfactant and hydrocarbon surfactant. The total amount of the first fluorosurfactant package may be approximately 0.06–4 wt % of the total weight of the ink composition. Preferably, the total amount of the first fluorosurfactant package is approximately 1 wt %. The fluorosurfactant may be present at approximately 0.01–1.5 wt % and the hydrocarbon surfactant may be present at approximately 0.05–2.5 wt %. Preferably, the fluorosurfactant is present at approximately 0.2 wt % and the hydrocarbon surfactant is present at approximately 0.4–1.5 wt %. While the examples described below indicate that one fluorosurfactant and one hydrocarbon surfactant are used in the first fluorosurfactant package, it is also contemplated that more than one fluorosurfactant and/or more than one hydrocarbon surfactant may be used within the scope of the invention.

The fixer polymer and the first fluorosurfactant package may have the same charge or the first fluorosurfactant package may be of neutral charge (nonionic). Since the fixer polymer is preferably cationic (because the dye in the ink is preferably anionic), the first fluorosurfactant package is cationic or nonionic. If one surfactant is used in the first fluorosurfactant package, that surfactant may be cationic or nonionic. In addition, more than one surfactant may also be used in the first fluorosurfactant package. For example, additional surfactants may be used to increase the solubility of a surfactant that is insoluble in solvents conventionally used in the fixer fluid. If more than one surfactant is used, each of the surfactants may be cationic or nonionic. While it is also contemplated that the solubility of the surfactant may be increased by changing the solvent, it is preferable that additional surfactants be used to increase the solubility.

When more than one surfactant is used in the first fluorosurfactant package, one of the surfactants may be a fluorosurfactant while the other surfactant may be a hydrocarbon surfactant. In this situation, either of the fluorosurfactant or the hydrocarbon surfactant may be cationic or nonionic. For example, if the fixer polymer in the fixer fluid is cationic and the fluorosurfactant is cationic, the hydrocarbon surfactant may be cationic or nonionic. If the fixer polymer is cationic and the fluorosurfactant is nonionic, the hydrocarbon surfactant may be cationic or nonionic. Preferably, the fluorosurfactant is cationic or nonionic and the hydrocarbon surfactant is nonionic.

Cationic and nonionic fluorosurfactants that may be used in the first fluorosurfactant package include, but are not limited to, cationic and nonionic fluoropolymers from the ZONYL® series of fluoropolymers. The ZONYL® series of fluoropolymers are available from DuPont (Wilmington, Del.) and include polytetrafluoroethylene ("PTFE"). However, other cationic and nonionic fluorosurfactants known in the art may also be used.

In the ZONYL® series of fluoropolymers, ZONYL® FSO, ZONYL® FSN, and ZONYL® FS-300 are exemplary nonionic fluorosurfactants that may be used in the present invention and ZONYL® FSD is an exemplary cationic fluorosurfactant that may be used in the present invention. ZONYL® FSO is an ethoxylated nonionic fluorosurfactant having the structure $RfCH_2CH_2O(CH_2CH_2O)_xH$, where Rf is $F(CF_2CF_2)_y$, x is 0 to approximately 15, and y is 1 to approximately 7. As supplied, ZONYL® FSO has 50% solids. ZONYL® FSN is a water soluble, ethoxylated nonionic fluorosurfactant that has the structure $RfCH_2CH_2O(CH_2CH_2O)_xH$, where Rf is $F(CF_2CF_2)_y$, x is 0 to approximately 25, and y is 1 to approximately 9. ZONYL® FSN is supplied having 40% solids. ZONYL® FS-300 is a nonionic fluorosurfactant having the structure $RfCH_2CH_2O(CH_2CH_2O)_zH$, where X<Y<Z. As supplied, ZONYL® FS-300 has 50% solids. ZONYL® FSD is a cationic fluorosurfactant and has the structure $F(CF_2CF_2)_{1-7}\text{-alkyl-}N^+R_3Cl^-$. ZONYL® FSD is supplied having 30% solids. Preferably, the fluorosurfactant used in the fixer fluid is ZONYL® FSN.

The hydrocarbon surfactant used in the first fluorosurfactant package may be a cationic or nonionic surfactant. Preferably, the hydrocarbon surfactant is nonionic. The hydrocarbon surfactant may include a nonionic hydrocarbon surfactant from the TETRONIC® series available from BASF Canada (Toronto, Ontario), The TERGITOL® series available from Union Carbide Co. (Houston, Tex.), the BRIJ® series available from ICI Americas (Wilmington, Del.), the SURFYNOL® series available from Air Products (Allentown, Pa.), or the TRITON® series available from Rohm & Haas (Philadelphia, Pa.). The TETRONIC® surfactants are tetrafunctional block copolymers of propylene oxide, ethylene oxide, and ethylene diamine. The TERGITOL® surfactants are alkyl polyethylene oxides. The BRIJ® surfactants are polyethoxylated alcohols and esters. The SURFYNOL® surfactants are acetylenic polyethylene oxides. The TRITON® surfactants are alkyl phenyl polyethylene oxides.

TETRONIC® 701, TERGITOL® 15-S-5, TERGITOL® 15-S-7, BRIJ® 30, TRITON® X-45, or SURFYNOL® 440 may be used as the hydrocarbon surfactant in the first fluorosurfactant package. Preferably, BRIJ® 30, which has the structure $CH_3(CH_2)_{10}CH_2(OCH_2CH_2)_4OH$ and the chemical name polyoxyethylene lauryl ether, is used as the hydrocarbon surfactant.

The fixer fluid may be prepared by direct mixing of the fixer polymer, the fluorosurfactant, the hydrocarbon surfactant, and the other components of the fixer fluid, as known in the art. The pH of the fixer fluid may be adjusted to increase the solubility of the components of the fixer fluid.

Ink

The ink may have a charged dye and a second fluorosurfactant package. The charged dye may have a charge opposite to the charge of the fixer polymer in the fixer fluid. The charged dye may include Acid, Direct, Food, Mordant, and Reactive dyes, which are commonly used in inkjet inks. Preferably, the charged dye is anionic and the charge of the dye may be provided by a nitroso, nitro, azo, stilbene, triarylmethane, xanthene, quinoline, thiazole, azine, oxazine, thiazine, aminoketone, anthraquinone, indigo, or phthalocyanine compound. The charged dye may include, but is not limited to, C.I. Food Black 2, C.I. Direct Black 168, and C.I. Direct Black 22, C.I. Acid Red 18, C.I. Acid Red 27, C.I. Acid Red 52, C.I. Acid Red 289, C.I. Acid Yellow 23, and C.I. Direct Blue 199, C.I. Acid Blue 9, Direct Blue 169, Direct Red 9, Direct Red 227, Direct Yellow 86, Direct Blue 86, Acid Blue 185, and their monovalent alkali ions such as $Na^+$, $Li^+$, $Cs^+$, and their $NH_4^+$, tetramethyl ammonium, and substituted ammonium salts.

The charged dye may be present in an amount sufficient to provide the desired color intensity of the printed ink. The charged dye may be present in a range from approximately 0.1 to 15 wt %, and preferably from approximately 0.5 to approximately 10 wt %. The amount of the anionic dye is not critical to the invention and, therefore, may vary depending on the desired color intensity. The ink may also include components known in the art, such as co-solvents, humectants, pH adjusting agents, antioxidants, and antibacterial agents depending on the desired properties of the ink. The ink may be optimized for print quality, throughput, durability, and pen reliability, as known in the art.

The second fluorosurfactant package may include at least one surfactant, which may be a fluorosurfactant, a hydrocarbon surfactant, a mixture of fluorosurfactants, a mixture of hydrocarbon surfactants, or a mixture of at least one fluorosurfactant and at least one hydrocarbon surfactant. Preferably, the second fluorosurfactant package has a fluorosurfactant and one or two hydrocarbon surfactants. The total amount of the second fluorosurfactant package present in the ink may be approximately 0.06–4 wt % of the total weight of the ink composition. The total amount of the second fluorosurfactant package is the amount of fluorosurfactant and hydrocarbon surfactant, if more than one surfactant is presented. Preferably, the total amount of the second fluorosurfactant package is approximately 2.2 wt %. The fluorosurfactant may be present at approximately 0.06–2 wt % and the amount of the hydrocarbon surfactant(s) may be approximately 0.05–2.5 wt %. Preferably, the fluorosurfactant is present at approximately 0.2 wt % and the hydrocarbon surfactant(s) is present at approximately 0.4–1.5 wt %. While the examples described below illustrate that one fluorosurfactant and two hydrocarbon surfactants are used in the ink, it is also contemplated that more than one fluorosurfactant and more than two hydrocarbon surfactants may be used.

The second fluorosurfactant package may have the same charge as the charge of the dye or may be nonionic. Where the dye is preferably anionic, the second fluorosurfactant package is preferably anionic or nonionic. If one surfactant is used in the second fluorosurfactant package, that surfactant may be anionic or nonionic. For example, if a fluorosurfactant is used in the second fluorosurfactant package, the fluorosurfactant may be anionic or nonionic. The second fluorosurfactant package may also include more than one surfactant. For example, if the fluorosurfactant is insoluble in solvents conventionally used in the ink, it may be necessary to add at least one hydrocarbon surfactant to increase the fluorosurfactant's solubility. While it is contemplated that the solubility of the fluorosurfactant may be increased by changing the solvent, it is preferable that a hydrocarbon surfactant(s) be added to increase the solubility.

When more than one surfactant is used in the second fluorosurfactant package, the surfactants may be a fluorosurfactant and at least one hydrocarbon surfactant. In this situation, either of the fluorosurfactant and the hydrocarbon surfactant may be anionic or nonionic. For example, if the charged dye is anionic and the fluorosurfactant is anionic, the hydrocarbon surfactant may be anionic or nonionic. If the charged dye is anionic and the fluorosurfactant is nonionic, the hydrocarbon surfactant may be anionic or nonionic. Preferably, the fluorosurfactant is anionic and the hydrocarbon surfactant is nonionic.

The first and second fluorosurfactant packages may be the same fluorosurfactant(s) and hydrocarbon surfactant(s) or may be different fluorosurfactant(s) and hydrocarbon surfactant(s). Preferably, the first and second fluorosurfactant packages have different fluorosurfactant(s) and hydrocarbon surfactant(s).

If a fluorosurfactant is used in the second fluorosurfactant package, the fluorosurfactant may be an anionic or nonionic fluorosurfactant. The fluorosurfactant may be an anionic or nonionic fluoropolymer from the ZONYL® series of fluoropolymers. For instance, ZONYL® FSA, ZONYL® FSP, ZONYL® 9361, ZONYL® FSE, ZONYL® FSJ, ZONYL® TBS, or ZONYL® FS-62 may be used as the anionic fluorosurfactant. ZONYL® FSA has the structure $RfCH_2CH_2SCH_2CH_2COO^-Li^+$, where Rf is $CF_3CF_2(CF_2CF_2)_x$, wherein x is 2–4. ZONYL® FSA is supplied having 25% solids. Preferably, the anionic fluorosurfactant is ZONYL® FSA. However, other anionic or nonionic fluorosurfactants known in the art may also be used.

If at least one hydrocarbon surfactant is used in the second fluorosurfactant package, the hydrocarbon surfactant may be anionic or nonionic. The hydrocarbon surfactant may be an anionic or nonionic hydrocarbon surfactant from the TETRONIC®, TERGITOL®, BRIJ®, SURFYNOL®, or TRITON® series of surfactants, which were previously discussed. The hydrocarbon surfactant may also be octanol, sodium xylene sulfonate ("SXS"), an anionic surfactant from the DOWFAX® series of surfactants (available from Dow Chemical Company (Midland, Mich.)), an anionic or nonionic surfactant from the AEROSOL® series of surfactants (available from Cytec Industries, Inc. (West Paterson, N.J.)), or an anionic or nonionic surfactant from the NEODOL® series of surfactants (available from Shell Chemicals, LP (Houston, Tex.)).

The DOWFAX® series of surfactants are alkylated diphenyl oxide disulfonates and includes numerous anionic compounds. Anionic or nonionic surfactants from the AEROSOL® series of surfactants include, but are not limited to, sulfosuccinate compounds. The anionic or nonionic surfactants from the NEODOL® series include, but are not limited to, high purity, high linearity primary alcohols. These primary alcohols typically have 75–85% by weight normal alcohols.

The hydrocarbon surfactant may include, but is not limited to, octanol, SXS, TETRONIC® 304, TETRONIC® 701, TERGITOL® 15-S-5, TERGITOL® 15-S-7, BRIJ® 30, TRITON® X-45, TRITON® X-200, AEROSOL® OT, SURFYNOL® 440, SURFYNOL® CT-111, SURFYNOL® SEF, DOWFAX® 2A1, DOWFAX® 8390, NEODOL® 1-9, NEODOL® 91-6, and NEODOL® 45-7. Preferably, the hydrocarbon surfactant is a mixture of AEROSOL® OT and TRITON® X-45. AEROSOL® OT is dioctyl sodium sulfosuccinate, which has the chemical structure of $C_{20}H_{37}O_7NaS$ and TRITON® X-45 is octoxynol-5.

The ink may be prepared by direct mixing of the charged dye, the fluorosurfactant, the at least one hydrocarbon surfactant, and the other components of the ink, as known in the art. The first and second fluorosurfactant packages of the fixer fluid and ink control puddling, thereby expanding freedom for ink formulation and pen architectural design. For example, solvents and fixer polymers that were known to contribute to puddling, but that had other desirable attributes, may be reconsidered for use in fixer fluids. As previously discussed, the charge of the dye in the ink is of an opposite charge to the charge of the fixer polymer in the fixer fluid. For example, if the dye is anionic, the fixer polymer is cationic. Conversely, if the dye is cationic, the fixer polymer is anionic. Preferably, the dye is anionic while the fixer polymer is cationic. Without being tied to a single theory, it is believed that when the ink and fixer fluid are deposited on the offset medium, the cationic fixer polymer binds with the anionic dye, thereby fixing the dye to the offset medium.

By applying the fixer fluid and the ink to the offset medium, the print quality and durability of offset printing may be improved. The fixer fluid may be deposited on the offset medium using a conventional inkjet printer. In order to accommodate the fixer fluid, the inkjet printer may be modified to include an additional inkjet pen, referred to as a fixer pen, which is similar to a conventional inkjet pen used to print color or black inks. This modification is known in the art and, therefore, is not described herein. The fixer fluid may be under-printed or over-printed relative to the ink. Preferably, the fixer fluid is over-printed. It is also contemplated that the fixer fluid and ink may be deposited at approximately the same time or that multiple layers of each of the fixer fluid and the ink may be deposited. The ink may be deposited on the offset medium using a conventional inkjet pen.

The offset medium has a nonporous coating on a surface of the offset medium. The offset medium may include, but is not limited to, LUSTRO™ Laser gloss (available from S. D. Warren), KROMCOTE™ (available from Champion Papers), UTOPIA™ Dull (available from Appleton Papers), CAROLINA™ Cover, Hammermill media, and Cascade media.

EXAMPLES

Inks and fixer fluids having various fluorosurfactant packages, dyes and/or polymers were formulated and different qualities of the formulated inks and fixer fluids were measured in an effort to assess the benefits attained in the practice of the invention, such as, puddling, dry time, area fill uniformity, optical density, water durability, cloud point, decap, banding, bloom, bleed edge acuity. Furthermore, the formulated inks and fixer fluids were evaluated to compare area fill uniformity of images when fixer fluids were over-printed and under-printed relative to the ink.

Example 1

Fixer Fluids Having the First Fluorosurfactant Package and PHMB

The components of the fixer fluids are shown in Table 1.

TABLE 1

| Components Of The Fixer Fluids | |
|---|---|
| Ingredient | Wt % |
| DOWANOL ® PnP | 5 |
| 2-pyrrolidinone | 6 |
| Alkyl Diol | 6.5 |
| PHMB | 5 |
| First Fluorosurfactant Package | See Table 2 |
| Fluorosurfactant, as supplied | |
| Hydrocarbon surfactant, as supplied | |
| DDI Water | balance |
| Total | 100 |
| Adjust pH to 4 with KOH or HCl | |

The only difference between the various formulated fixer fluids described in Table 1 was the surfactants used in the first fluorosurfactant package. The first fluorosurfactant package included a fluorosurfactant and a hydrocarbon surfactant. ZONYL® FSO, ZONYL® FSN, ZONYL® FS-300, or ZONYL® FSD was used as the fluorosurfactant while TETRONIC® 701, TERGITOL® 15-S-5, TERGITOL® 15-S-7, BRIJ® 30, TRITON® X-45, or SURFYNOL® 440 was used as the hydrocarbon surfactant. The first fluorosurfactant package was present at approximately 1 wt %, with the fluorosurfactant present at approximately 0.3–0.8 wt % and the hydrocarbon surfactant present at approximately 0.3–0.6 wt %. The combinations of fluorosurfactant and hydrocarbon surfactant that were formulated are shown in Table 2, along with the amounts of each component and identifying numbers FX-1 through FX-24. To act as controls, fixer fluids with no surfactants (FX-26), with PHMB as the fixer polymer and SILWET® L7607 as the surfactant (FX-25), and with PEI (20%) as the fixer polymer and SILWET® L7607 as the surfactant (FX-0) were also produced.

TABLE 2

Summary Of Fixer Fluid Performances As A Function Of The First Fluorosurfactant Package

| Fixer Fluid ID | First Surfactant | Package: (wt %) | Decap (sec) | Cloud Point | Dry Time Rank 1 = Best | Ave. Bar OD | Ave. Trans mOD | Ave. Smudge mOD | Puddling | Area Fill Uniformity 1 = Best |
|---|---|---|---|---|---|---|---|---|---|---|
| FX-0* | Silwet L7607: 1 | | 96, 24 | | 2 | 0.78 | 5 | 19 | heavy | 2 |
| FX-1 | Zonyl FSO: 0.4 | | 9 | >90 C. | 2 | 0.89 | 5 | 12 | very little | 2 |
| FX-2 | Zonyl FSO: 0.4 | Tetronic 701: 0.5 | 13 | 40 C. | 2 | 0.90 | 11 | 17 | little | 2 |
| FX-3 | Zonyl FSO: 0.4 | Tergitol 15S5 & 15S7: 0.25 & 0.25 | 0 | 85 C. | 1 | 0.91 | 9 | 17 | clean | 3 |
| FX-4 | Zonyl FSO: 0.4 | Brij 30: 0.4 | 0 | >90 C. | 3 | 0.91 | 6 | 19 | clean | 3 |
| FX-5 | Zonyl FSO: 0.4 | Triton X-45: 0.5 | 4 | >90 C. | 1 | 0.92 | 20 | 20 | little | 3 |
| FX-6 | Zonyl FSO: 0.4 | Surfynol 440: 0.4 | 5 | >90 C. | 1 | 0.91 | 13 | 18 | little | 3 |
| FX-7 | Zonyl FSN: 0.5 | | 5 | >90 C. | 1 | 0.92 | 14 | 22 | clean | 3 |
| FX-8 | Zonyl FSN: 0.5 | Tetronic 701: 0.5 | 0 | 40 C. | 1 | 0.89 | 15 | 23 | clean | 2 |
| FX-9 | Zonyl FSN: 0.5 | Tergitol 15S5 & 15S7: 0.25 & 0.25 | 5 | >90 C. | 2 | 0.90 | 20 | 25 | clean | 2 |
| FX-10 | Zonyl FSN: 0.5 | Brij 30: 0.4 | 0 | >90 C. | 1 | 0.90 | 13 | 14 | clean | 1 |
| FX-11 | Zonyl FSN: 0.5 | Triton X-45: 0.5 | 5 | >90 C. | 1 | 0.90 | 17 | 21 | little | 2 |
| FX-12 | Zonyl FSN: 0.5 | Surfynol 440: 0.4 | 4 | >90 C. | 2 | 0.90 | 17 | 21 | little | 2 |
| FX-13 | Zonyl FS-300: 0.4 | | 0 | >90 C. | 3 | 0.91 | 10 | 13 | some | 2 |
| FX-14 | Zonyl FS-300: 0.4 | Tetronic 701: 0.5 | 0 | 40 C. | 1 | 0.92 | 17 | 15 | some | 2 |
| FX-15 | Zonyl FS-300: 0.4 | Tergitol 15S5 & 15S7: 0.25 & 0.25 | 0 | 85 C. | 2 | 0.90 | 14 | 16 | heavy | 2 |
| FX-16 | Zonyl FS-300: 0.4 | Brij 30: 0.4 | 0 | >90 C. | 3 | 0.90 | 6 | 17 | heavy | 3 |
| FX-17 | Zonyl FS-300: 0.4 | Triton X-45: 0.5 | 4 | >90 C. | 2 | 0.89 | 7 | 23 | heavy | 2 |
| FX-18 | Zonyl FS-300: 0.4 | Surfynol 440: 0.4 | 4 | >90 C. | 3 | 0.90 | 14 | 21 | heavy | 2 |
| FX-19 | Zonyl FSD: 0.67 | | 5 | >90 C. | 3 | 0.87 | 9 | 27 | very little | 4 |
| FX-20 | Zonyl FSD: 0.67 | Tetronic 701: 0.5 | 5 | 40 C. | 3 | 0.89 | 15 | 22 | clean | 4 |
| FX-21 | Zonyl FSD: 0.67 | Tergitol 15S5 & 15S7: 0.25 & 0.25 | 5 | >90 C. | 3 | 0.88 | 14 | 23 | clean | 4 |
| FX-22 | Zonyl FSD: 0.67 | Brij 30: 0.4 | 5 | >90 C. | 3 | 0.89 | 11 | 23 | clean | 4 |
| FX-23 | Zonyl FSD: 0.67 | Triton X-45: 0.5 | 5 | >90 C. | 2 | 0.89 | 13 | 28 | clean | 4 |
| FX-24 | Zonyl FSD: 0.67 | Surfynol 440: 0.4 | 5 | >90 C. | 3 | 0.86 | 11 | 24 | clean | 4 |
| FX-25 | Silwet L7607: 1 | | 3 | >90 C. | 3 | 0.92 | 21 | 37 | heavy | 2 |
| FX-26 | | | 0 | >90 C. | 3 | 0.90 | 13 | 22 | heavy | 2 |

*FX-0 used PEI as the fixer polymer while all other compositions used PHMB

The components listed in Tables 1 and 2 were directly mixed to produce each fixer fluid.

Example 2

Fixer Fluids Having the First Fluorosurfactant Package and Additional Fixer Polymers

Fixer fluids having additional cationic polyamines as the fixer polymer are prepared. These fixer fluids have the components listed in Table 1, except that the fixer polymer is changed from PHMB to PEI or a copolymer of HMB and HMG.

Example 3

Inks Having the Second Fluorosurfactant Package and an Anionic Dye

The components of the inks are shown in Table 3. The inks also included an anionic dye that was present at approximately 0.5 to 10 wt %.

TABLE 3

Components Of The Inks

| Ingredient | Wt % |
|---|---|
| 2-pyrrolidinone | 6 |
| DOWANOL ® PnP | 5 |
| Alkyl Diol | 6.5 |
| Second Fluorosurfactant Package | See Table 4 |
| Fluorosurfactant, as supplied | |
| Hydrocarbon surfactant(s), as supplied | |
| DDI Water | Balance |
| Total | 100 |
| Adjust pH to 7.5 with NaOH or HNO$_3$ | |

The inks included the second fluorosurfactant package, which had a fluorosurfactant and at least one hydrocarbon surfactant. These inks were formulated with inks having a mixture of hydrocarbon surfactants. The only difference between the various formulated inks described in Table 3 was the mixture of surfactants used. Specifically, ZONYL® FSA, an anionic fluorosurfactant, was tested with various hydrocarbon surfactants including octanol, SXS, TETRONIC® 304, TETRONIC® 701, TERGITOL® 15-S-5, TERGITOL® 15-S-7, BRIJ® 30, TRITON® X-45, TRITON® X-200, AEROSOL® OT, SURFYNOL® 440, SURFYNOL® CT-111, SURFYNOL® SEF, DOWFAX® 2A1, DOWFAX® 8390, NEODOL® 1-9, NEODOL® 91-6, and NEODOL® 45-7. In addition, mixtures of hydrocarbon surfactants were tested without a fluorosurfactant. The mixtures of fluorosurfactant and hydrocarbon surfactant that were formulated are shown in Table 4, with identifying numbers (SU1 through SU19) in the first column. The amounts of the fluorosurfactant and hydrocarbon surfactants used in each ink are also shown in Table 4. To act as controls, an ink having 1% SILWET L7607 (SU1), an ink having no surfactants (SU2), and an ink having one surfactant (SU3) were produced. The remaining inks (SU4–SU16 and SU19) included the fluorosurfactant package or a mixture of hydrocarbon surfactants listed in Table 4.

TABLE 4

Summary Of Ink Performances As A Function Of The Second Fluorosurfactant Package

| Ink ID | Second Fluoro-surfactant Package: (wt %) | Puddling | Cloud Point to 90° C. | Decap no heat (sec) | Decap 85° C. (sec) | Dry time Blue ink, 3-pass print mode, 128 pl/300 dpi, 85° C. Lustro ™ Laser | Dry time Secondary, 2-pass print mode, 128 pl/300 dpi, 80° C. Lustro ™ Laser | Kromcote ™ | Utopia ™ Dull |
|---|---|---|---|---|---|---|---|---|---|
| SU1 | Silwet L7607: 1 | heavy | clear | 0 | 2 | 0 | 0 | 0 | 1 |
| SU2 | No Surfactant | heavy | clear | 0+ | 2 | 0 | 5 | 4 | 4 |
| SU3 | Tetronic 304: 1 | heavy | clear | 0 | 2 | 0 | 5 | 4 | 5 |
| SU4 | Tetronic 701: 0.5 Dowfax 2A1: 0.5 Zonyl FSA: 0.8 | clean | cloudy @ 70° C. tiny oil drop | 4+ | 4+ | 0 | 1 | 0 | 3 |
| SU5 | Tergitol 15-S-5: 0.25 Tergitol 15-S-7: 0.25 Dowfax 8390: 0.5 | heavy | clear | 0 | 2 | 0 | 2 | 0 | 5 |
| SU6 | Tergitol 15-S-5: 0.25 Tergitol 15-S-7: 0.25 SXS: 0.5 | heavy | clear | 0 | 2 | 0 | 4 | 1? wrong side | 4 |
| SU7 | Brij 30: 0.35 Dowfax 8390: 0.3 Zonyl FSA: 0.7 | clean | clear | 2– | 4– | 0 | 3 | 0 | 3 |
| SU8 | Triton X-45: 0.4 Aerosol TO: 0.7 | heavy | clear | >24 | >24 | 0 | 3 | 0 | 2 |
| SU9 | Triton X-45: 0.4 Triton X-200: 0.4 | heavy | clear | 0 | 2– | starting 1 | 4 | 3 | 5 |
| SU10 | Octanol: 0.6 Dowfax 8390: 0.6 | heavy | clear | 0 | 0 | 0 | 1 | 0 | 3 |
| SU11 | Surfynol 440: 0.4 SXS: 0.4 Zonyl FSA: 0.7 | clean | clear | 0+ | 2+ | 0 | 3 | 0 | 3 |
| SU12 | Surfynol CT-111: 0.4 Dowfax 2A1: 0.5 Zonyl FSA: 0.7 | clean | clear | 0+ | 2+ | ? 3 | 4 | 5 at start | 4 |
| SU13 | Surfynol SEF: 0.4 Dowfax 8390: 0.4 Zonyl FSA: 0.7 | clean | clear | 4 | 4– | 0 | 2 | 0 | 4 |
| SU14 | Neodol 1-9: 0.5 Dowfax 2A1: 0.5 | heavy | clear | 0 | 0 | 0 | 4 | 0 | 4 |
| SU15 | Neodol 91-6: 0.5 Aerosol TO: 0.5 | heavy | clear | >24 | >24 | 0 | 4 | 0 | 4 |
| SU16 | Neodol 45-7: 0.5 SXS: 0.5 | heavy | clear | 0 | 2 | 0 | 5 | 1 | 5 |
| SU19 | Aerosol TO: 0.85 Triton X-45: 0.5 Zonyl FSA: 0.8 | clean | clear | 8 | 8 | 0 | 0 | 0 | 1 |

Scale for Dry time: 0 = None; 1 = Tiny dot not objectionable; 2 = Noticeable, unacceptable; 3 = Significant blotting, unacceptable; 4 = Heavy blotting, unacceptable The components listed in Tables 3 and 4 were directly mixed to produce each ink.

Example 4

Testing Performed on the Fixer Fluids and the Inks

The fixer fluids having the first fluorosurfactant packages listed in Table 2 and the inks having the second fluorosurfactant packages listed in Table 4 were tested for puddling, dry time, area fill uniformity, optical density, water durability, cloud point, decap, and/or banding.

Puddling was tested on an inkjet printer similar to the DeskJet® 2200C/2500C printer, manufactured by Hewlett-Packard Co. (Palo Alto, Calif.). The ink and fixer fluid were printed with inkjet pens similar to the pens used in the DeskJet® 2200C/2500C printer. Both high frequency puddling and low frequency puddling were examined. The pens were manually wiped clean before printing and then three pages were printed. The orifice cleanness was rated after printing the three pages. Photographs of the printhead were taken after printing to record the amount of puddling. In addition, visual observations of the printhead were monitored and recorded.

To determine the cloud point, each fixer fluid or ink was placed in an oven and stored for one hour at each temperature. The temperature of the oven was increased 10° C. every hour, up to a temperature of 90° C. The cloudiness of the fixer fluid or ink was visually observed and recorded.

The decap time was tested with an inkjet pen (8 pl) similar to the inkjet pen used in a DeskJet® 2200C/2500C printer. The decap time was measured at 24° C., 49% relative humidity using an inkjet printer similar to the DeskJet® 2200C/2500C printer. The decap time was also tested at 85° C. Short term decap was tested in a 21° C., 55% relative humidity environment. The short term decap was measured with no heat and at 85° C.

The dry time was tested with the fixer fluid in an inkjet pen similar to the inkjet pen used in a DeskJet® 2200C/2500C printer and the ink in the default pen, which results in 120 pl/300 dpi pixel. The dry time was tested by stacking eight sheets on top of the imaged area immediately after the printed image was ejected from the inkjet printer. Secondary color was printed with an inkjet pen similar to the inkjet pen used in a DeskJet® 2200C/2500C printer at 128 pl density in a 21° C., 55% relative humidity environment. The dry times were tested at 2- and 3-pass printmodes, at an ink flux of 128 pl/300 dpi, and at temperatures of 0° C., 80° C., and 85° C. While the 2- and 3-pass printmodes take longer to print the desired image than a 1-pass printmode, because each pass only prints a portion of the ink, the resulting print quality of the desired image is improved.

The wet durability was tested by printing an image on an inkjet printer similar to the DeskJet® 2000 printer, manufactured by Hewlett-Packard Co. (Palo Alto, Calif.). Fixer fluid was in the K pen and ink in the C pen. Area fill uniformity was tested by visually comparing the uniformity of print samples across various offset media. Depending on the weight and velocity of an inkjet drop, puddling may cause banding. The extent of banding was visually evaluated.

Example 5

Performance Results of the Fixer Fluids

The puddling, dry time, area fill uniformity, optical density ("OD"), water durability, cloud point, and decap results for the fixer fluids described in Example 1 are reported in Table 2.

FX-0, which used SILWET® L7607 as the surfactant, exhibited heavy puddling. FX-26, the fixer fluid with no surfactants, also exhibited heavy puddling. All of the fixer fluids having ZONYL® FS-300 (FX-13 through FX-18) exhibited some or heavy puddling and, therefore, ZONYL® FS-300 was not optimal for use as the fluorosurfactant in the fixer fluid. The fixer fluids including the nonionic fluorosurfactants ZONYL® FSO (FX-1 through FX-6) and ZONYL® FSN (FX-7 through FX-12) were clean of puddling or exhibited little or very little puddling. The fixer fluids having the cationic fluorosurfactant ZONYL® FSD (FX-19 through FX-24) were also clean of puddling or exhibited very little puddling.

The fixer fluids having ZONYL® FSD exhibited slower dry times than the other fixer fluids. The fixer fluids including ZONYL® FSN exhibited the fastest dry times. The fixer fluids having the remaining fluorosurfactants exhibited variable dry times, depending on the specific hydrocarbon surfactant that was used.

Fixer fluids having ZONYL® FSD exhibited poor area fill uniformity, probably due to the cationic fluorosurfactant reacting strongly with the ink. Therefore, ZONYL® FSD was not optimal for use as the fluorosurfactant in the fixer fluid.

The fixer fluids having ZONYL® FSO exhibited improved durability compared to the fixer fluids having ZONYL® FSN. However, the ZONYL® FSN fixer fluids exhibited improved area fill uniformity compared to the ZONYL® FSO.

The fixer fluids having TETRONIC® 701 as the hydrocarbon surfactant exhibited a low cloud point (40° C.) and, therefore, TETRONIC® 701 was not optimal for use as the hydrocarbon surfactant in the fixer fluid. The remaining combinations of fluorosurfactants and hydrocarbon surfactants exhibited desirable cloud points of 85° C. or greater than 90° C.

While the fixer fluids having ZONYL® FSO, ZONYL® FSN, or ZONYL® FSD exhibited improved puddling properties, the ZONYL® FSD fixer fluids exhibited less than optimal area fill uniformity. Therefore, both the ZONYL® FSD fixer fluid and the ZONYL® FS-300 fixer fluid, which exhibited heavy puddling, were not optimal for use in the fixer fluids. Of the other tested fluorosurfactants, the ZONYL® FSO fixer fluids exhibited improved durability while the ZONYL® FSN fixer fluids demonstrated improved area fill uniformity. However, the combination of ZONYL® FSN and BRIJ® 30 (FX-10) exhibited the best, overall performance across the various properties.

Example 6

Fixer Fluids with Reduced Amounts of the Fixer Polymer

Fixer fluids were produced according to Table 1, except that the amount of fixer polymer was decreased from 5% to 4%. These fixer fluids exhibited comparable results to those obtained with 5% fixer polymer. The lower amount of fixer polymer also had a large, desirable effect on the decap rate.

Specifically, the fixer fluid having 4% fixer polymer exhibited a short term decap of 24 seconds in comparison to 96 seconds for the fixer fluid having 5% fixer polymer.

Example 7

Performance Results of the Inks

The puddling, cloud point, decap, and dry time results for the inks described in Example 3 are shown in Table 4. Inks SU4, SU7, SU11–SU13, and SU19 were clean of puddling. SU4 utilized TETRONIC® 701, DOWFAX® 2A1, and ZONYL® FSA as the second surfactant package. For SU7, BRIJ® 30, DOWFAX® 8390, and ZONYL® FSA were used as the second surfactant package. For SU11, SURFYNOL® 440, SXS, and ZONYL® FSA were used as the second surfactant package. For SU12, SURFYNOL® CT-111, DOWFAX® 2A1, and ZONYL® FSA were used as the second surfactant package. SU13 used SURFYNOL® SEF, DOWFAX® 8390, and ZONYL® FSA as the second surfactant package. For SU19, AEROSOL® OT, TRITON® X-45, and ZONYL® FSA were used as the second surfactant package. Based on these results, puddling of the ink appeared to be dramatically improved by using ZONYL® FSA in the second surfactant package.

Figure 1A:
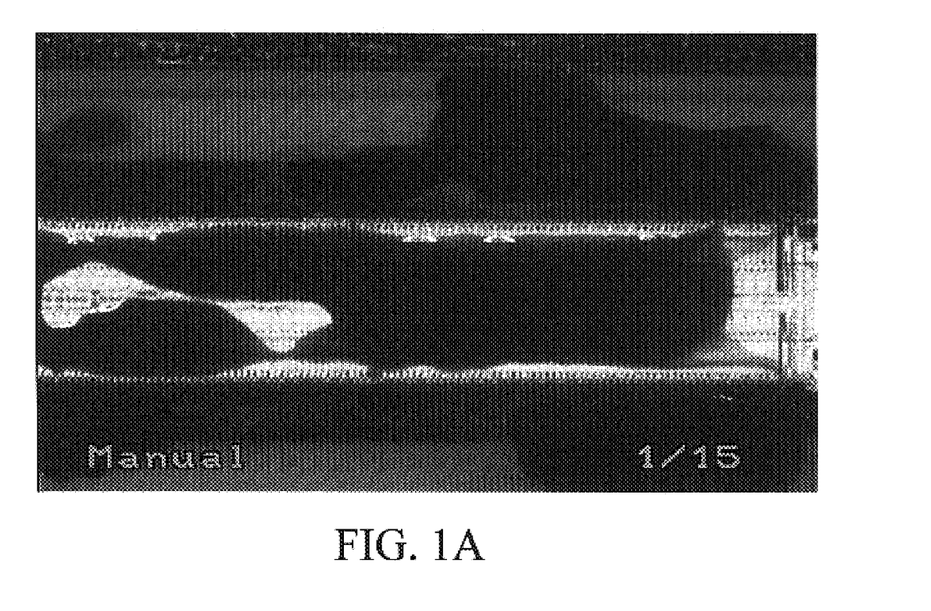
FIG. 1A illustrates the puddling exhibited by a cyan ink lacking a second fluorosurfactant package.
Figure 1B:
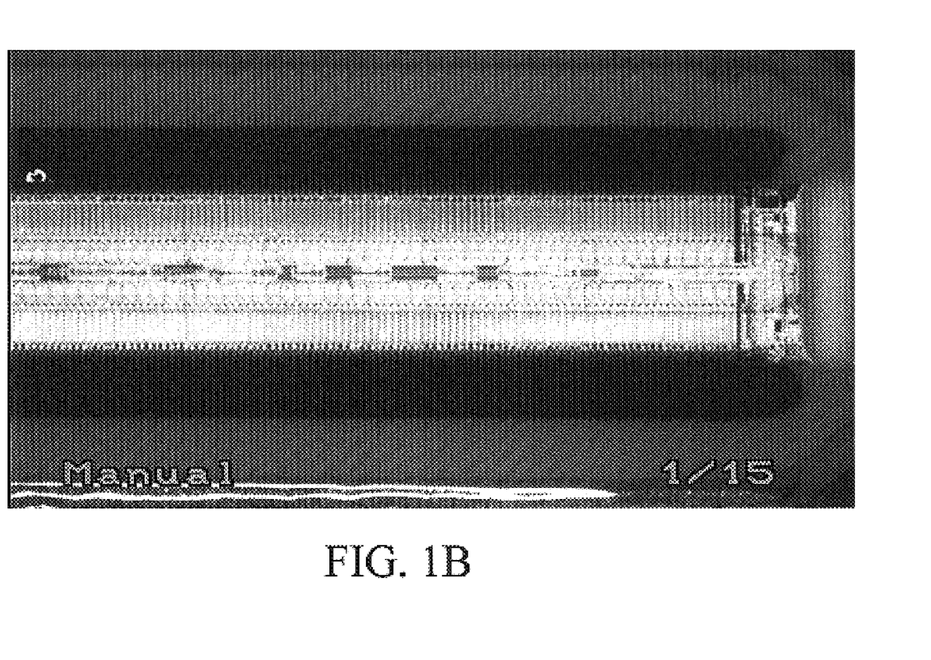
FIG. 1B illustrates the puddling exhibited by a cyan ink having a second fluorosurfactant package.
Figure 2A:
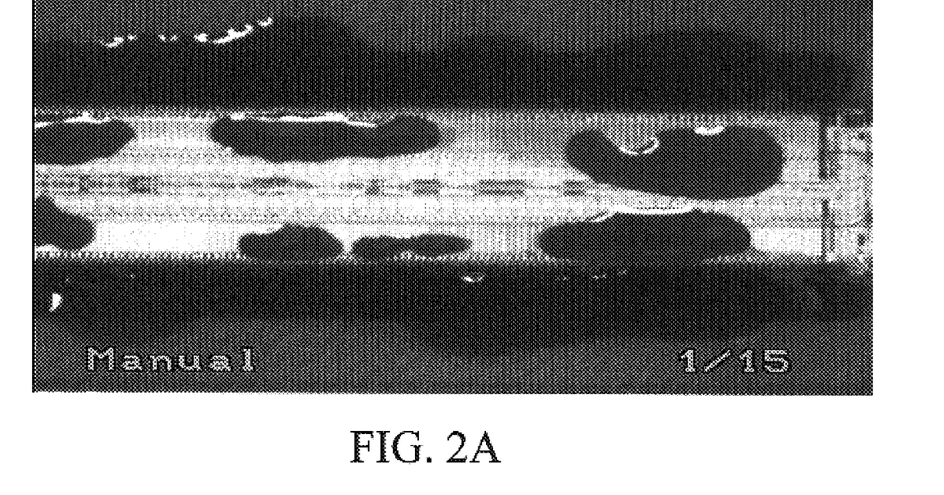
FIG. 2A illustrates the puddling exhibited by a magenta ink lacking the second fluorosurfactant package.
Figure 2B:
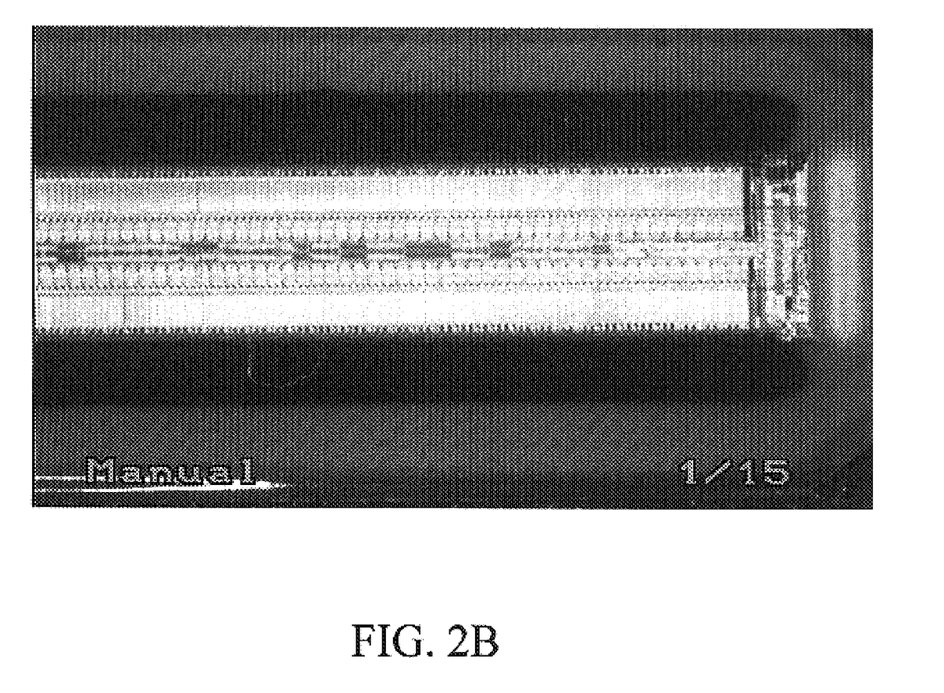
FIG. 2B illustrates the puddling exhibited by a magenta ink that includes a second fluorosurfactant package.
Figure 3A:
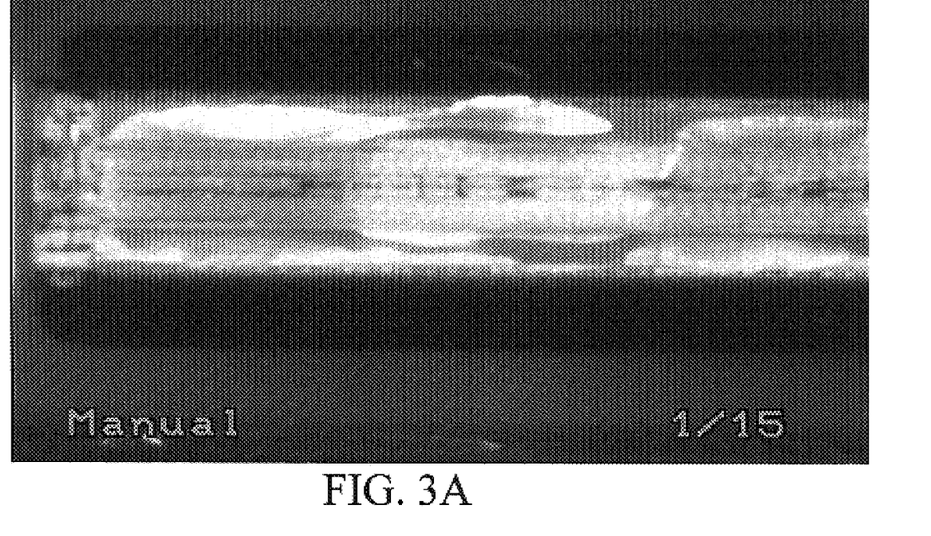
FIG. 3A illustrates the puddling exhibited by a yellow ink lacking the second fluorosurfactant package.
Figure 3B:
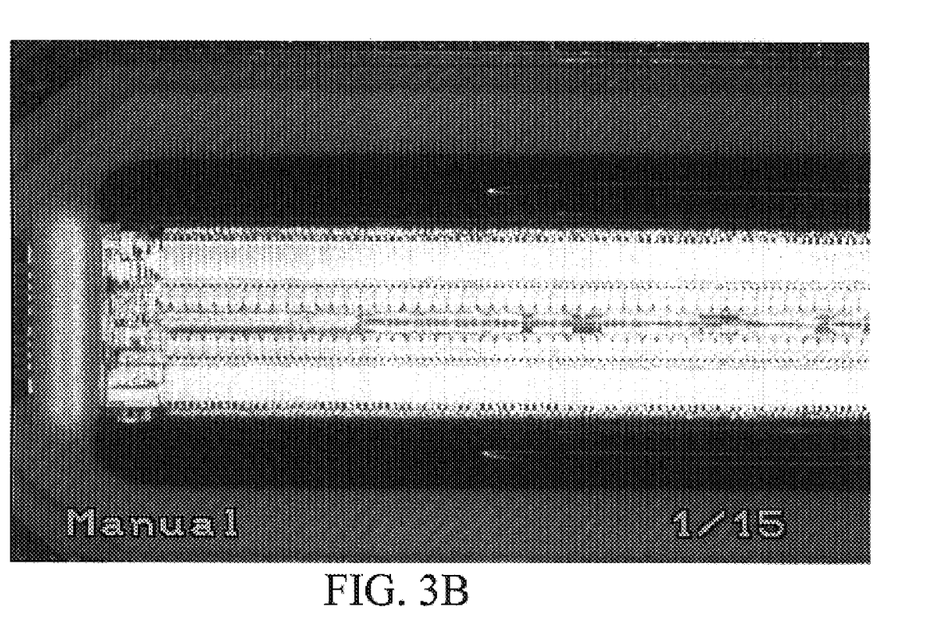
FIG. 3B illustrates the puddling exhibited by a yellow ink that has a second fluorosurfactant package.

As shown in FIGS. 1–3, cyan, magenta, and yellow SU19 inks exhibited a marked reduction in puddling compared to cyan, magenta, and yellow SU1 inks. FIGS. 1A, 2A, and 3A showed heavy puddling on the printhead when the cyan, magenta, and yellow SU1 inks were printed. In contrast, FIGS. 1B, 2B, and 3B show no puddling on the printhead when the cyan, magenta, and yellow SU19 inks were printed.

The cloud points of the inks are displayed in Table 4. All of the inks, except SU4, were clear of clouding up to a temperature of 90° C. SU4 exhibited clouding at 70° C.

The decap times of the inks with no heat and at 85° C. are shown in Table 4. Only SU8 and SU15 exhibited decap times of greater than 24 seconds. Most of the remaining inks had decap times ranging from approximately 0 seconds to approximately 4+ seconds, except that SU19 had a decap of 8 seconds.

As shown in Table 5, the SU19 ink also exhibited improved decap across ink colors in comparison to the SU1 ink.

TABLE 5

Decap of SU1 and SU19 Inks.

| Ink Color | Decap (sec) SU1 | Decap (sec) SU19 |
|---|---|---|
| Cyan | 0 | 8 |
| Magenta | 0 | 8 |
| Yellow | 6 | 8 |

The dry times of the inks at 2-pass and 3-pass printmodes are shown in Table 4. In the 3-pass printmode, most of the inks exhibited acceptable dry times, except for SU12. In the 2-pass printmode, SU4 and SU10 had acceptable dry times on the LUSTRO® Laser and KROMCOTE® offset media. SU5, SU7, SU8, SU11, and SU13–SU15 exhibited acceptable dry times in the 2-pass printmode on the KROMCOTE® offset media. In general, the 3-pass printmode produced faster dry times than the 2-pass printmode, which is consistent with the longer print time in the 3-pass printmode.

A direct comparison of the dry times of SU1 and SU19 are shown in Table 6 for 2-pass and 3-pass printmodes at various temperatures and at an ink flux of 128 pl/300 dpi. The temperatures tested (0° C., 80° C., and 85° C.) were chosen to differentiate ink performances.

TABLE 6

Dry times of SU1 and SU19 at 2-pass and 3-pass printmodes and at various temperatures

| Offset Media | 3-pass printmode, 85° C. | | 3-pass printmode, 0° C. | | 2-pass printmode, 85° C. | | 2-pass printmode, 80° C. | |
|---|---|---|---|---|---|---|---|---|
| | SU1 | SU19 | SU1 | SU19 | SU1 | SU19 | SU1 | SU19 |
| LUSTRO Laser | 1 | 1 | 2 | 1 | 3 | 3 | 4 | 4 |
| KROMCOTE | 0 | 0 | 0 | 0 | 2 | 2 | 3 | 3 |
| UTOPIA Dull | 2 | 2 | 2 | 2 | 4 | 4 | 4 | 4 |

0 = None; 1 = Tiny dot not objectionable; 2 = Noticeable, unacceptable; 3 = Significant blotting, unacceptable; 4 = Heavy blotting, unacceptable Under these test conditions, the SU1 and SU19 exhibited substantially equivalent dry times. The 3-pass printmode produced a better dry time than the 2-pass printmode due to the longer print time.

Example 8

Bloom, Bleed, 1-Pass Color OD, and Edge Acuity Performance and Results

Bloom and bleed were eliminated when the first surfactant package, the second surfactant package, or both surfactant packages were used. In addition, color OD and edge acuity were improved when the first surfactant package, the second surfactant package, or both surfactant packages were used. As illustrated in Table 7, bloom and bleed were eliminated when the second fluorosurfactant in the ink included a fluorosurfactant and at least one hydrocarbon surfactant. Inks having ZONYL® FSA as the fluorosurfactant exhibited the best improvement in bloom and bleed.

TABLE 7

Bloom and Bleed of Inks

| Surfactant | Secondary Color Bloom 85° C. |
|---|---|
| SILWET ® L7607 (SU1) | 5 |
| AEROSOL ® OT/TRITON ® X-45 (SU8) | 5 |
| AEROSOL ® OT/TRITON ® X-45/ZONYL ® FSA (SU19) | 1 |
| TETRONIC ® 304 (SU3) | 5 |
| DOWFAX ®/SURFYNOL ® CT-111 | 5 |
| DOWFAX ® 2A1/SURFYNOL ® CT-111/ZONYL ® FSA (SU12) | 1 |

1: best (no bloom)
5: worst (heavy bloom)

Images were printed at one pass on LUSTRO™ Laser offset media with inkjet pens (7.5 pl) similar to those used in a DeskJet® 2200C/2500C printer. The fixer fluid was printed over the SU1 and SU19 inks. The printed images were compared to determine any differences in color OD and edge acuity.

Figure 4A:
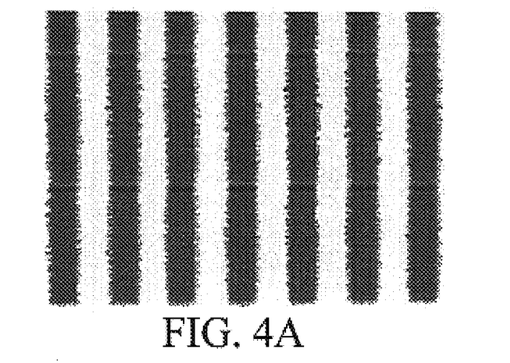
FIG. 4A illustrates the optical density and edge acuity of an inkjet printing system lacking the first and second fluorosurfactant packages.
Figure 4B:
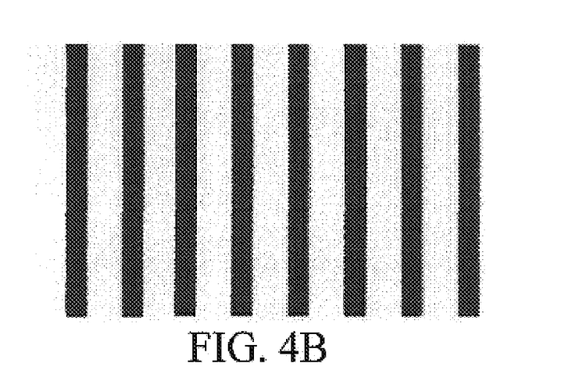
FIG. 4B illustrates the optical density and edge acuity of an inkjet printing system having the second fluorosurfactant package.
Figure 4C:
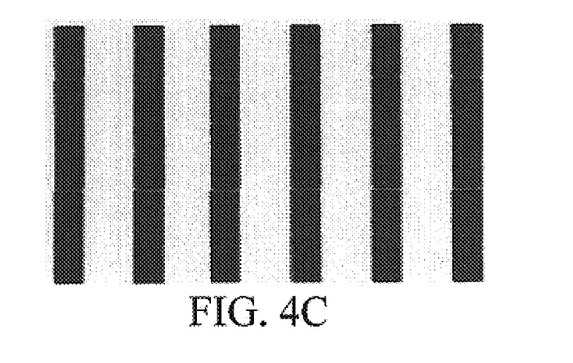
FIG. 4C illustrates the optical density and edge acuity of an inkjet printing system having the first fluorosurfactant package.

A comparison of FIGS. 4A–4C shows that higher OD and sharper edges were achieved when either the ink or the fixer fluid included a fluorosurfactant package. FIG. 4A shows the edge acuity and color OD when neither the ink nor the fixer fluid have a fluorosurfactant package. FIG. 4B shows the edge acuity and color OD when the SU19 ink, which has AEROSOL® OT, TRITON® X-45, and ZONYL® FSA as the second fluorosurfactant package, is used with the FX-0 fixer fluid. FIG. 4C shows the edge acuity and color OD when the FX-10 fixer fluid, which has ZONYL® FSN and BRIJ 30® as the first fluorosurfactant package, is used with the SU1 ink.

Example 9

Application of the Fixer Fluid and Ink to Offset Media

The fixer fluids described in Example 1 are printed on offset media with the inks, which are described in Example 3. The fixer fluid is deposited on the offset media using a fixer pen, while the ink is deposited using a conventional inkjet pen. The offset media that are tested include LUSTRO™ Laser gloss, KROMCOTE™, and UTOPIA™ Dull. The fixer fluid is over-printed relative to the ink. In additional tests, the fixer fluid is under-printed relative to the ink.

Example 10

Banding Results

Figure 5A:
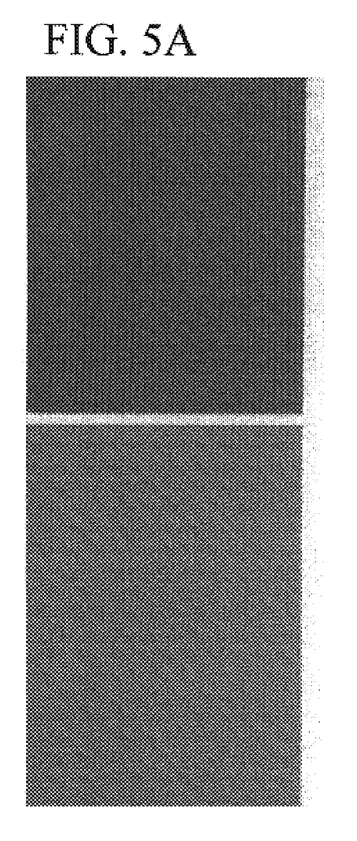
FIG. 5A illustrates the banding property of an ink lacking the second fluorosurfactant package.
Figure 5B:
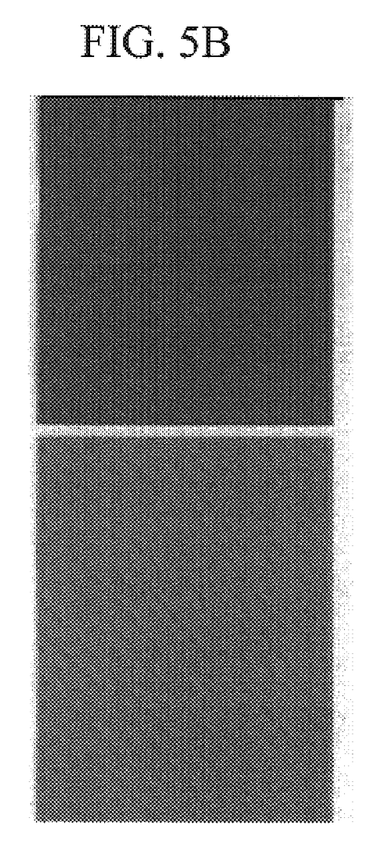
FIG. 5B illustrates the banding property of an ink having the second fluorosurfactant package.

Banding was compared between the SU1 and SU19 inks and is shown in FIGS. 5A and 5B. The SU1 ink showed increased banding as puddles built up. In contrast, the SU19 ink was more robust in banding performance.

While the invention may be susceptible to various modifications and alternative forms, specific embodiments have been shown by way of example in the drawings and have been described in detail herein. However, it should be understood that the invention is not intended to be limited to the particular forms disclosed. Rather, the invention is to cover all modifications, equivalents, and alternatives falling within the spirit and scope of the invention as defined by the following appended claims.

What is claimed is:

1. An inkjet printing system for use in offset printing comprising:
a fixer fluid comprising a cationic fixer polymer and a first fluorosurfactant package, the first fluorosurfactant package comprising a fluorosurfactant present in an amount ranging from about 0.01 wt % to 1.5 wt % and a hydrocarbon surfactant present in an amount ranging from about 0.05 wt % to 2.5 wt %, wherein the fluorosurfactant is a cationic or nonionic fluoropolymer and the hydrocarbon surfactant is polyoxyethylene lauryl ether and wherein the cationic fixer polymer is poly(hexamethylene biguanide) or a copolymer of hexamethylene guanide and hexamethylene biguanide; and
an ink comprising an anionic dye and a second fluorosurfactant package, the second fluorosurfactant package comprising an anionic fluorosurfactant and at least one anionic or nonionic hydrocarbon surfactant.

2. The inkjet printing system of claim 1, wherein the cationic fixer polymer is poly(hexamethylene biguanide).

3. The inkjet printing system of claim 1, wherein the cationic fixer polymer is present in an amount ranging from approximately 0.5–7 wt %.

4. The inkjet printing system of claim 1, wherein the fluorosurfactant of the first fluorosurfactant package is a polytetrafluoroethylene.

5. The inkjet printing system of claim 1, wherein the fluorosurfactant of the first fluorosurfactant package is $RfCH_2CH_2O(CH_2CH_2O)_xH$, wherein Rf is $F(CF_2CF_2)_y$, x is 0 to approximately 15, and y is 1 to approximately 7 or $F(CF_2CF_2)_{1-7}$-alkyl-$N^+R_3Cl^-$.

6. The inkjet printing system of claim 1, wherein the fluorosurfactant of the first fluorosurfactant package is $RfCH_2CH_2O(CH_2CH_2O)_xH$, wherein Rf is $F(CF_2CF_2)_y$, x is 0 to approximately 25, and y is 1 to approximately 9.

7. The inkjet printing system of claim 1, wherein the cationic fixer polymer is poly(hexamethylene biguanide) and the fluorosurfactant of the first fluorosurfactant package has the chemical structure of $RfCH_2CH_2O(CH_2CH_2O)_xH$, wherein Rf is $F(CF_2CF_2)_y$, x is 0 to approximately 25, and y is 1 to approximately 9.

8. An inkjet printing system for use in offset printing comprising:
a fixer fluid comprising a cationic fixer polymer and a first fluorosurfactant package, the first fluorosurfactant package comprising a fluorosurfactant present in an amount ranging from about 0.01 wt % to 1.5 wt % and a hydrocarbon surfactant present in an amount ranging from about 0.05 wt % to 2.5 wt %, wherein the fluorosurfactant is a cationic or nonionic fluoropolymer and the hydrocarbon surfactant is polyoxyethylene lauryl ether and wherein the cationic fixer polymer is poly(hexamethylene biguanide) or a copolymer of hexamethylene guanide and hexamethylene biguanide; and
an ink comprising an anionic dye and a second fluorosurfactant package, the second fluorosurfactant package comprising an anionic fluorosurfactant and at least one anionic or nonionic hydrocarbon surfactant, wherein the anionic fluorosurfactant of the second fluorosurfactant package has the chemical structure of $RfCH_2CH_2SCH_2CH_2COO^-Li^+$, wherein Rf is $CF_3CF_2(CF_2CF_2)_x$ and x is 2–4.

9. The inkjet printing system of claim 8, wherein the hydrocarbon surfactant of the first fluorosurfactant package is polyoxyethylene lauryl ether.

10. An inkjet printing system for use in offset printing comprising:
a fixer fluid comprising a cationic fixer polymer and a first fluorosurfactant package, the first fluorosurfactant package comprising a fluorosurfactant and a hydrocarbon surfactant, wherein the fluorosurfactant is a cationic or nonionic fluoropolymer and the hydrocarbon surfactant is cationic or nonionic; and
an ink comprising an anionic dye and a second fluorosurfactant package, the second fluorosurfactant package comprising an anionic fluorosurfactant and at least one anionic or nonionic hydrocarbon surfactant, wherein the at least one anionic or nonionic hydrocarbon surfactant of the second fluorosurfactant package is selected from the group consisting of octanol, sodium xylene sulfonate, a tetrafunctional block copolymer of propylene oxide, ethylene oxide, and ethylene diamine, an alkyl polyethylene oxide, a polyethoxylated alcohol, a polyethoxylated ester, an acetylenic polyethylene oxide, an alkyl phenyl polyethylene oxide, an alkylated diphenyl oxide disulfonate, and a sulfosuccinate.

11. The inkjet printing system of claim 10, wherein the hydrocarbon surfactant of the first fluorosurfactant package is present in an amount ranging from approximately 0.05–2.5 wt % and the fluorosurfactant of the first fluorosurfactant package is present in an amount ranging from approximately 0.01–1.5 wt %.

12. The inkjet printing system of claim 10, wherein the at least one anionic or nonionic hydrocarbon surfactant of the second fluorosurfactant package is a mixture of an alkyl phenyl polyethylene oxide and a sulfosuccinate.

13. The inkjet printing system of claim 10, wherein the anionic fluorosurfactant of the second fluorosurfactant package has the chemical structure of $RfCH_2CH_2SCH_2CH_2COO^-Li^+$, wherein Rf is $CF_3CF_2(CF_2CF_2)_x$ and x is 2–4, and the at least one anionic or nonionic hydrocarbon surfactant of the second fluorosurfactant package is a mixture of dioctyl sodium sulfosuccinate and octoxynol-5.

14. A method of improving print quality in offset printing comprising:
    depositing an ink and a fixer fluid on an offset medium wherein the fixer fluid comprises a cationic fixer polymer and a first fluorosurfactant package, the first fluorosurfactant package comprising a cationic or nonionic fluorosurfactant and a cationic or nonionic hydrocarbon surfactant; wherein the ink comprises an anionic dye and a second fluorosurfactant package, the second fluorosurfactant package having an anionic fluorosurfactant and at least one anionic or nonionic hydrocarbon surfactant, wherein the at least one anionic or nonionic hydrocarbon surfactant is selected from the group consisting of octanol, sodium xylene sulfonate, a tetrafunctional block copolymer of propylene oxide, ethylene oxide, and ethylene diamine, an alkyl polyethylene oxide, a polyethoxylated alcohol, a polyethoxylated ester, an acetylenic polyethylene oxide, an alkyl phenyl polyethylene oxide, an alkylated diphenyl oxide disulfonate, and a sulfosuccinate.

15. The method of claim 14, wherein the cationic fixer polymer in the fixer fluid is selected from the group consisting of polyethylene imine, poly(hexamethylene biguanide), and a copolymer of hexamethylene guanide and hexamethylene biguanide.

16. The method of claim 14, wherein the cationic fixer polymer in the fixer fluid comprises poly(hexamethylene biguanide).

17. The method of claim 14, wherein the first fluorosurfactant package in the fixer fluid comprises a fluorosurfactant with the chemical formula $RfCH_2CH_2O(CH_2CH_2O)_xH$, wherein Rf is $F(CF_2CF_2)_y$, x is 0 to approximately 25, and y is 1 to approximately 9.

18. The method of claim 14, wherein the first fluorosurfactant package in the fixer fluid comprises a cationic or nonionic hydrocarbon surfactant selected from the group consisting of a tetrafunctional block copolymer of propylene oxide, ethylene oxide, and ethylene diamine, an alkyl polyethylene oxide, a polyethoxylated alcohol, a polyethoxylated ester, an acetylenic polyethylene oxide, and an alkyl phenyl polyethylene oxide.

19. The method of claim 14, wherein the cationic fixer polymer in the fixer fluid comprises poly(hexamethylene biguanide), and the first fluorosurfactant package in the fixer fluid comprises a cationic or nonionic fluorosurfactant having the chemical formula $RfCH_2CH_2O(CH_2CH_2O)_xH$, wherein Rf is $F(CF_2CF_2)_y$, x is 0 to approximately 25, and y is 1 to approximately 9, and the cationic or nonionic hydrocarbon surfactant in the fixer fluid comprises polyoxyethylene lauryl ether.

20. The method of claim 14, wherein the second fluorosurfactant package in the ink comprises an anionic fluorosurfactant having the chemical structure of $RfCH_2CH_2SCH_2CH_2COO^-Li^+$, where Rf is $CF_3CF_2(CF2CF_2)_x$ and x is 2–4.

21. The method of claim 14, wherein the second fluorosurfactant package in the ink comprises a mixture of a sulfosuccinate and an alkyl phenyl polyethylene oxide as the at least one anionic or nonionic hydrocarbon surfactant.

22. The method of claim 14, wherein the second fluorosurfactant package in the ink comprises an anionic fluorosurfactant having the chemical structure of $RfCH_2CH_2SCH_2CH_2COO^-Li^+$, where Rf is $CF_3CF_2(CF2CF_2)_x$ and x is 2–4, and the at least one anionic or nonionic hydrocarbon surfactant in the ink comprises a mixture of dioctyl sodium sulfosuccinate and octoxynol-5.

23. The method of claim 14, wherein depositing the ink and fixer fluid on an offset medium comprises under-printing the fixer fluid relative to the ink on the offset medium.

24. The method of claim 14, wherein depositing the ink and fixer fluid on an offset medium comprises over-printing the fixer fluid relative to the ink on the offset medium.

25. The method of claim 14, wherein the fixer fluid comprising a cationic fixer polymer and a first fluorosurfactant package has improved durability and print quality.

26. The method of claim 14, wherein the ink comprising an anionic dye and a second fluorosurfactant package has improved puddling.

* * * * *